June 20, 1939.  F. W. BURGER  2,162,696

WHEEL

Filed Dec. 7, 1936  2 Sheets-Sheet 1

Inventor
Frederick W. Burger
By Brown, Jackson, Boettcher & Dienner
Attys

June 20, 1939.  F. W. BURGER  2,162,696
WHEEL
Filed Dec. 7, 1936  2 Sheets-Sheet 2

Inventor.
Frederick W. Burger
By Brown Jackson Boettcher Dienner
Attys

Patented June 20, 1939

2,162,696

UNITED STATES PATENT OFFICE 2,162,696

WHEEL

Frederick W. Burger, Niles, Mich., assignor to Clark Equipment Company, Buchanan, Mich., a corporation of Michigan Application December 7, 1936, Serial No. 114,564

15 Claims. (Cl. 301—12)

This invention relates to wheels, and more particularly is directed to wheels of the type used on power-driven agricultural vehicles such as tractors or the like.

The use of pneumatic tires on farm tractors and other industrial power-driven vehicles has become increasingly prevalent in the past few years, and has raised problems of wheel construction and design tending toward simplification of the rim mountings and tire support. In addition, it has been found necessary to provide constructions wherein the tread distance between the wheels of the tractor can be varied to suit the particular purpose for which the tractor may be employed. For example, in using such tractors for cultivation of crops or the like, the tread distance must be adjusted in accordance with the spacing of crop rows. This requires that a simplified and economic structure providing for such variation must be designed.

I am aware that various attempts have been made previously to secure the advantages incident to the provision of a tractor having means for securing such variations in tread. For example, specially designed axle shafts have been provided, whereby the hubs of the wheels may be moved axially of the shaft to produce the required tread spacing. This is undesirable due to the overhang of the axle when the wheels are in their inner most position for cultivation of crops in which the rows are closely spaced, such as corn, potatoes or the like. In another attempted solution of this problem, a heavy peripheral solid cast ring has been secured to the wheel body or hub, and can be reversed in position to secure a difference between extreme positions of some 14 inches at each wheel. However, in this latter construction, the wheels cannot be moved to their successive positions with respect to the hub in even increments of movement, and the construction is also objectionable due to overhang of the wheel body projections when the rim is in innermost position. In most of the constructions with which I am familiar, expensive machining operations are required to secure the desired advantages, and the constructions are of extreme weight and complicated in design.

The present invention contemplates an improved construction of this general type which is simple in structure and adjustment and is capable of economical production, while still attaining a range of tread spacings sufficient for all normal conditions in which the tractor or similar vehicle is to be employed.

It is one object of the present invention to provide a construction wherein the inner surface of the rim is provided with spaced lugs secured thereto, and shaped to be mounted in a number of positions with respect to clamping means carried by a wheel body.

Another feature of the present invention is the simplified manner in which the rim can be shifted from one position to another position without requiring the dismounting of the rim from the wheel body, but merely loosening of the clamping lugs carried by the wheel body to facilitate axial movement of the rim.

Still another advantage secured by the present invention is the provision of a wheel structure which, when the rim is in its innermost position, presents no projecting peripheral bosses or the like, which are extremely objectionable.

The present invention also possesses the advantage of producing a chording action on the rim when it is mounted in position in order to seat it firmly on the lugs against any possible lateral displacement, and provides a mounting arrangement which positively holds the rim against any lateral cocking or tilting.

The present invention possesses another distinct advantage in that the hub of the wheel body is maintained in fixed position with respect to the axle housing and drive spindle, while other variations in tread spacing are accommodated by shifting of the rim with respect to the lug clamping means or by shifting of the intermediate rings interposed between the rim and the hub. In addition, the present construction is economical to manufacture, the lugs being simple drop forgings or castings, while the ring and wheel body or hub may be castings so designed so as to require little machining.

Other objects and advantages of the present invention will appear more fully from the following detailed description which, taken in conjunction with the accompanying drawings, will disclose to those skilled in the art the particular construction and operation of a preferred form of the present invention.

Figure 1:
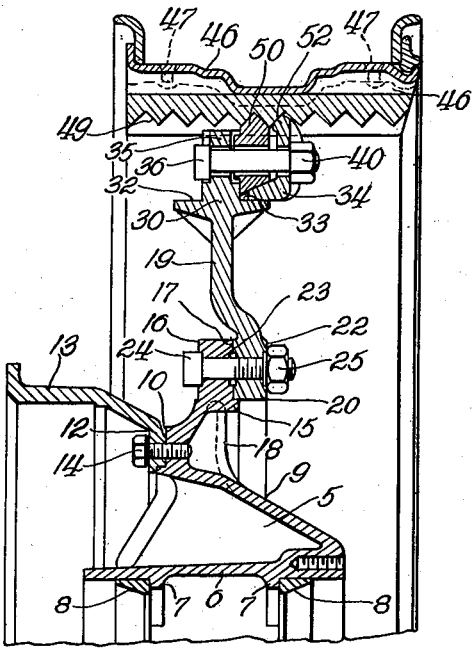
Figure 1 is a vertical sectional view through a wheel construction embodying the principles of the present invention.
Figure 2:
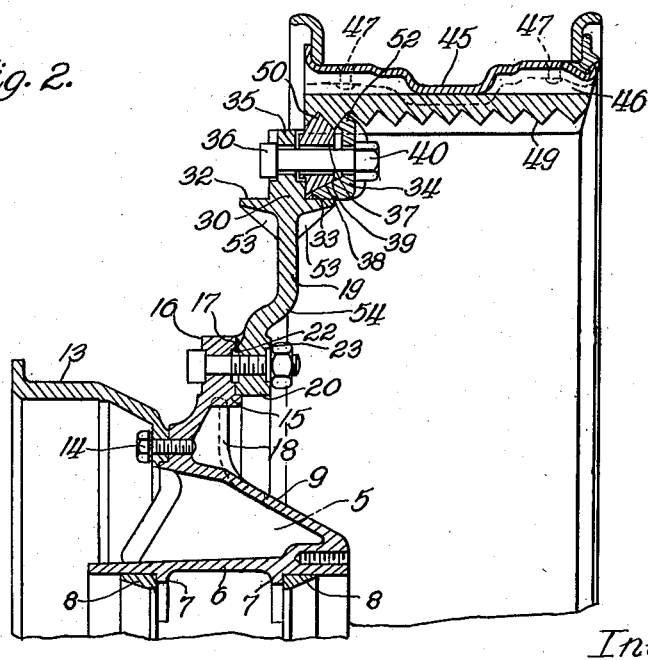
Figure 2 is a view corresponding to Figure 1 showing the rim mounted in a different position upon the clamping means, and also showing the intermediate ring mounted in an alternative position on the hub.
Figure 3:
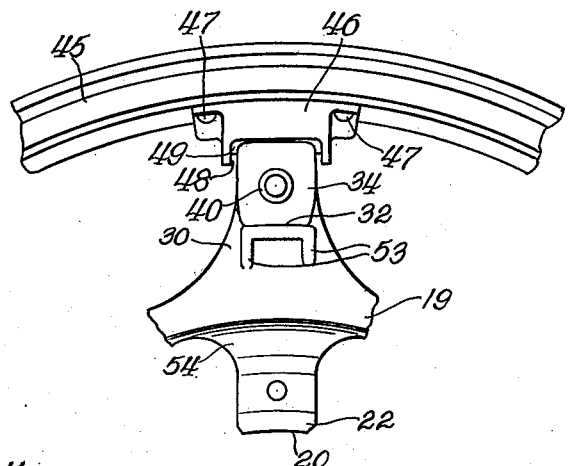
Figure 3 is a partial side elevational view of the construction shown in Figure 2.

Referring now in detail to the embodiment of the invention shown in Figures 1 to 3, I provide a wheel hub 5 having an inner tubular wall 6 provided with bearing receiving flanges 7 forming seats for the outer races 8 of the bearing assemblies which support the hub at the end of the arm of the axle housing.

The hub is provided with arched portions 9 terminating at the inboard side of the wheel in radially and axially extending bosses 10 adapted to receive the inwardly extending flanged end 12 of a brake drum 13. The drum is secured to the bosses 10 by means of the circumferentially spaced bolts 14 extending through the flange 12 and threaded into the bosses 10.

The hub is provided with radially extending projections 15 forming spoke simulating portions, and terminating in oppositely faced bosses 16 and 17. Reinforcing ribs or arches 18 are provided for assisting in transmitting the load from the rim to the wheel hub.

Mounted on either one of the bosses 16 or 17, depending upon the tread spacing desired, is an intermediate ring member 19 which may be formed as a casting or the like, and which is provided at its inner periphery with radially inwardly extending projections 20 having oppositely machined surfaces 22 and 23 adapted to be engaged respectively with either of the boss surfaces 16 or 17 of the projections 15. The ring is rigidly secured to the hub 5 by means of the bolts 24 having head portions seated in recesses formed in the boss surfaces 16 and 17, and having threaded ends projecting through suitable openings formed in the radially inwardly extending bosses 20 of the ring 19. A suitable nut 25 is adapted to be threaded over the projecting end of the bolt 24 to clamp the ring 19 rigidly in position against either of the bosses 16 or 17.

It is to be understood that either surface 22 or 23 of the rim may be clamped to either of the boss surfaces 16 or 17 of the wheel hub, thereby providing four alternate positions of the ring 19 with respect to its mounting on the hub 5. For example, in the innermost position of the ring, the boss 22 will be clamped against the boss surface 16 of the projections 15, while in its outermost position, the boss 22 will be clamped against the surface 17 of the projection 15. In the intermediate positions the boss 23 may be clamped against either the surface 16 or the surface 17.

About its outer periphery, the ring 19 is provided with a plurality of spaced projections 30 extending radially outwardly in line with the inwardly extending projections 20, although the bosses 20 may be staggered between alternate projections 30 if so desired. The projections 30 are provided with laterally extending seating portions 32 and 33 forming seats for receiving the wedge members 34. Disposed radially outwardly of the seating surfaces 32 and 33, and extending transversely between these surfaces are projecting boss portions 35 which are apertured to receive the clamping bolts 36. The clamping bolts 36 are adapted to extend through the openings in the bosses 35 in either direction, and receive the lugs 37 having elongated apertures formed therein allowing vertical movement of the lugs 37 with respect to the bolts 36. Each of the lugs 37 is provided with a tapered surface 38 at its radial inner end, which tapered surfaces are adapted to be engaged by corresponding tapered surfaces 39 formed on, and projecting laterally of the wedge members 34. Suitable nuts 40 are threaded onto the projecting ends of the bolts 36, and when tightened serve to force the wedge members 34 inwardly on either of the lateral seating surfaces 32 or 33 producing radial outward movement of the blocks 37, these blocks bearing against either of the faces of the bosses 35.

A tire rim 45 is provided which may be of any desired type, and which has secured to the inner web surface thereof at suitably spaced intervals corresponding to the spacings of the projections 30, clamping blocks of the type shown generally in Figures 1 and 3. These clamping blocks are indicated by the reference numeral 46 and are preferably secured to the rim by countersunk rivet members 47, as illustrated in the drawings. The member 46 is provided with a central channel shaped portion 48 having the serrated or saw tooth edge formation at 49 forming a plurality of V-shaped teeth spaced uniformly and of uniform angularity.

The block 37 and the wedge 34 are each provided on their upper edges with corresponding V-shaped portions 50 and 52, respectively, which are adapted to engage in adjacent recesses between the respective teeth 49 to thereby mount the rim in position on the wheel body. As shown in Figure 2, these members may have engagement with the extreme end teeth of the member 46, or may have engagement with intermediate teeth, depending upon the position in which it is desired to mount the rim with respect to the wheel body. Upon tightening of the nut 40, the block 37 is moved radially outwardly by means of the wedge surfaces 38 and 39, and chords the rim radially about the wheel body, thus locking it in fixed lateral position. At the same time, the wedge block 34, by reason of its engagement at 52 with the teeth 49, holds the rims against lateral displacement and produces a wedging action between the tooth recess and the outer end of the block 37. The radial load from the rim is transmitted to the hub by the block 39, the wedge portion 37 of the block 34, the seating surface 32 or 33 with which the wedge lug 34 is engaged, and the reinforcing ribs 53 to the ring member 19, and from this ring member the load is transmitted through the clamping connection between the projecting bosses 20 and 15 to the hub 5.

The ring 19 is preferably provided with an intermediate offset portion 54 whereby an additional offset of the rim with respect to the wheel body is obtained. In the position shown in Figure 2, the rim is positioned in its outermost position on the outboard side of the ring 19, which in turn is mounted in its outermost position on the outboard side of the hub projections 15. The thickness of the bosses 15 and 20, the amount of offset at the point 54 in the ring 19, the width of the ring 45, and the number of teeth 49 formed in the block 46 will determine the movement of positions in which the rims may be located with respect to the hub 5. It is apparent that a wide range is provided by the present construction inasmuch as the rim has approximately 9 different positions with respect to the block 37 and lug 34 which, in turn have two alternate positions with respect to the ring 19. While some of these positions obviously overlap, nevertheless, a sufficient number of different positions are provided to accommodate all required variations in tread spacing without in any way limiting the application of the present invention to additional positions by increasing the amount of offset in the ring or by increasing the number of teeth in the block 46.

Figure 4:
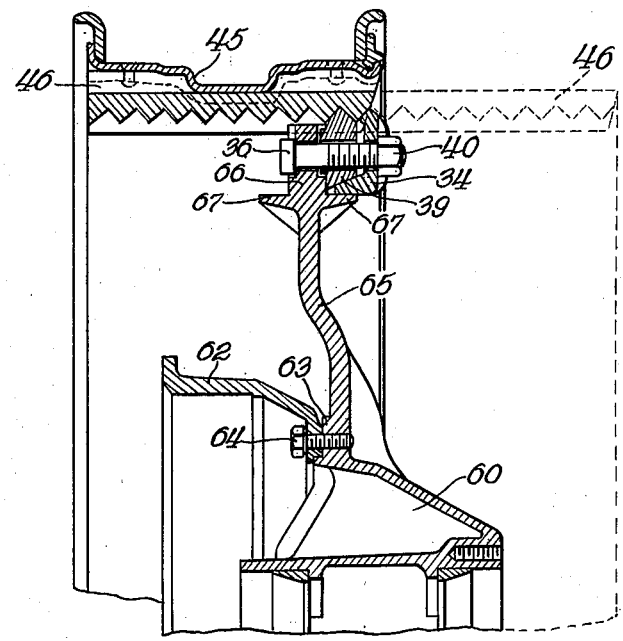
Figure 4 is a view corresponding to Figure 1 showing a modified type of wheel body construction.

In the embodiment of the invention shown in Figure 4, I have replaced the ring and hub construction shown in Figures 1 and 2 with an integrally formed hub and radially extending offset flange.

Considering this modification of the invention in detail, the hub 60 corresponds to the hub 5 as far as its mounting upon an axle arm is concerned, and also as far as the mounting of the brake drum 62 on the boss 63 of the hub by means of the bolts 64 is concerned.

However, instead of providing radially extending projections 15, I provide an integral disc-like flange 65 which is offset to the inboard side of the hub 60, and which at its outer end, is formed with a plurality of projections 66 corresponding to the projections 30 of the ring 19 of the previous embodiment. Each of the projections 66 is defined at its radial inboard end by laterally spaced seating portions 67 which are adapted to receive the block 39 and the wedge lug 34 in the same manner as described in connection with the seating surfaces 32 and 33. The rim 45 is provided with blocks 46 as previously described, which are mounted in the same manner upon the outer ends of the members 39 and 34.

In the position shown in Figure 4, the rim 45 is mounted in its innermost position with respect to the members 34 and 39, although these members may, if desired, be mounted on the inboard side of the projection 66 to further decrease the spacing between the two wheels. The dotted line position, indicated in Figure 4, shows the rim mounted in its outermost position as provided by the present construction, which does not produce as great a tread spacing as is produced by the embodiment of the invention shown in Figures 1 and 2. However, the construction shown in Figure 4 is advantageous in its simplicity of design and cost of manufacture, and where the range of tread spacings is not required to be quite as large as that provided by the construction shown in Figures 1 and 2, the construction shown in Figure 4 has marked advantages.

It is apparent that the present construction can be modified to a considerable extent within the scope of the present invention in order to provide increases or decreases in the range of tread spacing such as by variation of the amount of offset, the thickness of the bosses, and the number of teeth and width of the rim 46. I therefore do not intend to limit the present invention to the particular details shown and described in connection with the illustrated embodiment thereof, but only insofar as defined by the scope and spirit of the appended claims.

I claim:

1. A wheel including a rim adapted to be shifted into different positions with respect to the center plane of the wheel, said wheel comprising a hub, a ring demountably attached to the periphery of said hub, a tire rim, a plurality of circumferentially spaced inwardly extending block members on said rim, and lug means carried optionally on either side of said ring, said block members being adapted to be mounted in a plurality of positions on said lug means, and movable radially outwardly by said lug means to chord said rim into fixed position on said ring.

2. A wheel comprising a wheel hub having coplanar radially outwardly extending bosses, a ring secured to said wheel hub bosses and having a laterally offset peripheral portion provided with outwardly extending bosses, a tire rim, inwardly extending blocks secured to the rim and having serrated seating surfaces, and lug means carried by said axially offset bosses and engaging in said seating surfaces for mounting said rim on said ring.

3. In combination, a wheel hub having a series of co-planar radially extending peripheral bosses, a ring having a corresponding series of inwardly extending bosses adapted to be clamped to said first-named bosses, a tire rim having circumferentially spaced inwardly extending block members rigidly secured thereto, and means carried by the periphery of said ring in laterally offset position from said inwardly extending ring bosses for engaging said block members for chording said rim into laterally fixed position on said ring.

4. In combination, a wheel body having a series of coplanar radially extending peripheral bosses, a tire rim having a series of circumferentially spaced members having axially spaced seating portions, and means carried by said body for engaging selected seating portions to mount said rim in predetermined position on said wheel body.

5. In combination, a wheel hub having a series of coplanar radially extending bosses, a ring clamped to said bosses and having a laterally offset peripheral portion including a circumferentially spaced series of coplanar bosses extending radially outwardly, a tire rim having a series of circumferentially spaced inwardly extending seating members each provided with a plurality of axially spaced lug-receiving seats, and lug means carried by said last-named bosses and having wedging engagement in selected ones of said seats for mounting said rim in laterally adjustable position on said ring.

6. A wheel comprising a wheel hub having radially outwardly extending bosses, a ring member adapted to be mounted in selected position thereon and having a radially extending flange portion laterally offset from said mounting portion and terminating at its outer periphery in circumferentially spaced radially extending bosses having axially extending planar seating surfaces extending normally to said bosses on opposite sides of the inner ends thereof.

7. A wheel comprising a wheel body having a radially extending flange portion terminating at its outer periphery in circumferentially spaced radially extending bosses having axially extending planar seating surfaces extending normally to said bosses on opposite sides of the inner ends thereof, a bolt extending axially through each of said bosses, a pair of cooperating lug members carried by each bolt on one side of said boss and having cooperating wedge surfaces whereby lateral inward movement of one member on said seating surface produces radial outward movement of the other member, and a tire rim having axially spaced means engaged by both said members for mounting said rim in radially chorded position when said lug members are tightened on said bolt.

8. The combination with a wheel body having spaced peripheral bosses and lug means carried thereby, of a tire rim having circumferentially spaced radially inwardly extending lug-receiving members secured thereto, each of said members having a plurality of axially spaced lug-receiving surfaces, and lug means carried by said bosses including an axially movable member and a radially movable member, each engaging adjacent lug receiving surfaces for chording said rim radially and simultaneously fixing it against lateral movement.

9. In combination, a wheel body, means providing a series of circumferentially spaced radially extending peripheral bosses on said wheel body each provided with oppositely extending lateral seats, a tire rim having a plurality of axially spaced seating portions disposed at circumferentially spaced points on its inner surface, and means optionally supported on either of said boss seats engaging predetermined ones of said seating portions for mounting said rim in selected axial position on said bosses.

10. Wheel body mounting means for a tire rim comprising a plurality of block members secured at spaced points to the annular inner surface of said rim, each of said block members having a channel-shaped portion extending transversely of said rim and opening toward the axis of said rim, and a series of identical lug-receiving seats formed in the web of said channel portion and spaced laterally therein.

11. The combination with a wheel body and a tire rim having laterally spaced inwardly directed wedge seats and adapted to be mounted thereon, of means carried by said wheel body providing a series of circumferentially spaced radially extending peripheral bosses having axially extending seating surfaces extending laterally on opposite sides of the radial inner end of said bosses and cooperating lug members, one of said lug members seating on either of said surfaces and having a wedging engagement with the other of said members whereby said other member is moved radially outwardly along said boss as said one member is moved laterally inwardly toward said boss, both said members engaging adjacent seats on said rim, whereby said rim is chorded radially and held against lateral movement by said members.

12. In combination, a wheel body having radially extending peripheral bosses provided at their inner ends with opposite axially extending seats, a tire rim having circumferentially spaced inwardly directed block members each having a plurality of laterally spaced seating surfaces, and lug means carried by said bosses including a member movable axially toward said boss on said seat and a second member movable radially outwardly by said axially movable member and engaging one of said surfaces, said first member engaging the next adjacent seating surface whereby said rim is chorded radially out of engagement with said boss and fixed against lateral movement.

13. Means for mounting a tire rim on a wheel body having a radial boss and an axially extending seat at the inner end of said boss, comprising a first lug engaging said rim and disposed against the face of said boss, a second lug having a portion sliding on said seat and engaging the innermost surface of said first lug for wedging the same radially outwardly, and means on said second lug engaging said rim at a point spaced laterally of said first lug.

14. Means for mounting a tire rim on a wheel body, said rim having circumferentially spaced inwardly directed blocks provided with axially extending serrated seating surfaces, comprising a pair of cooperating lugs on the wheel body, one of said lugs having its radial outer periphery formed to seat in one of the serrations of said surface and the other lug engaging an adjacent face of the next serration and having a portion movable axially between the innermost end of said one lug and said wheel body to produce radial outward movement of said first lug for chording said rim.

15. Means for mounting a tire rim on a wheel hub comprising a ring member demountably secured to said hub in a plane normal to the axis thereof and having a laterally offset flange portion terminating in radially extending bosses at its periphery, and lug means optionally mounted on either lateral side of said bosses each comprising a pair of interengaging lug members for chording said rim radially outwardly of said bosses and holding the rim in fixed lateral position with its mid-plane parallel with the plane of said ring member.

FREDERICK W. BURGER.